July 10, 1928.
R. A. SEAGER
1,676,966
CONNECTING LINK FOR CROSS CHAINS OF ANTISKID CHAINS
Filed June 23, 1927
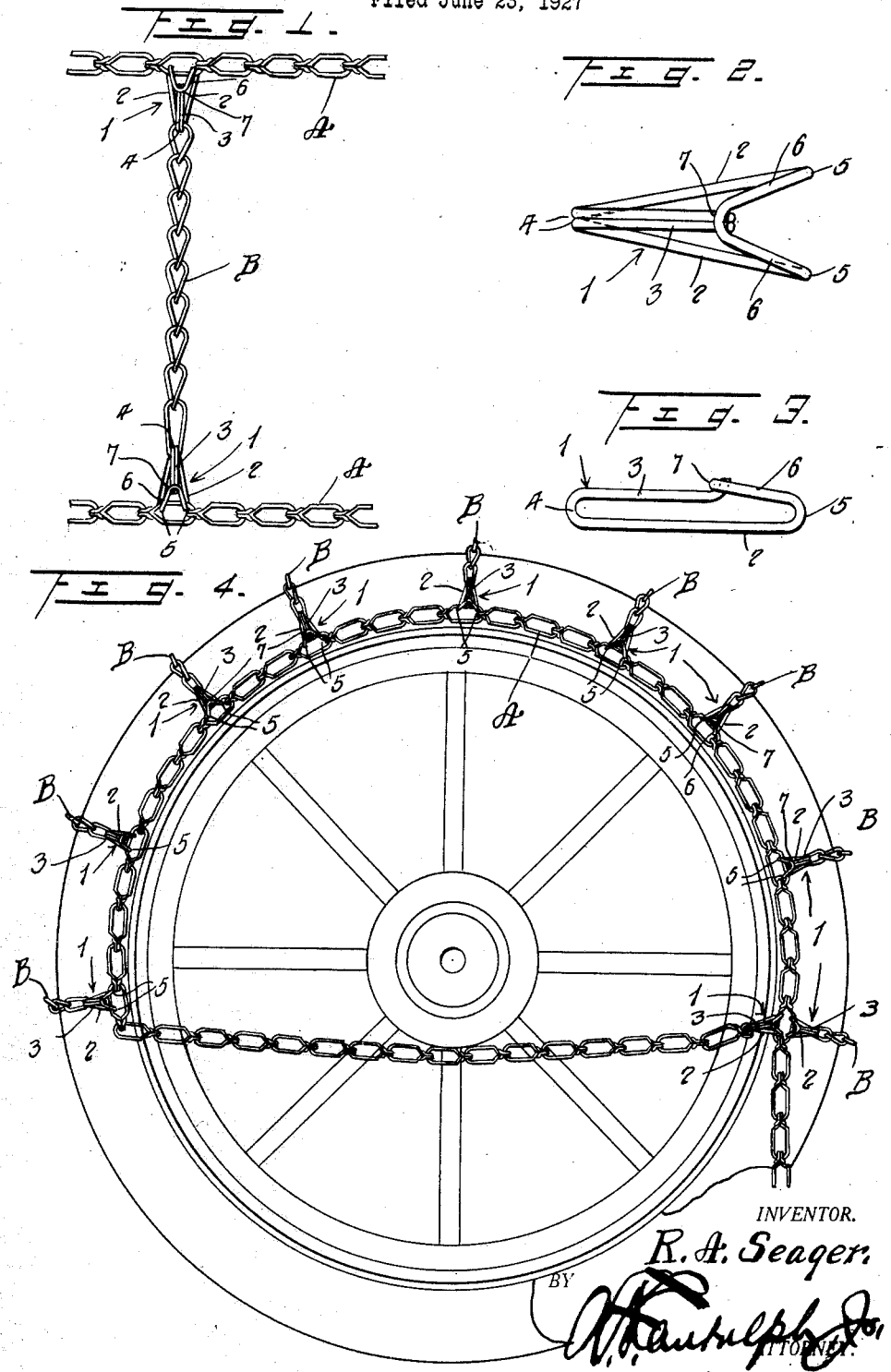
INVENTOR.
R. A. Seager.
BY
ATTORNEY.

Patented July 10, 1928.

1,676,966

UNITED STATES PATENT OFFICE.

ROYAL A. SEAGER, OF OGDEN, UTAH.

CONNECTING LINK FOR CROSS CHAINS OF ANTISKID CHAINS.

Application filed June 23, 1927. Serial No. 200,938.

The invention relates to anti-skid chains for automobile tires employing the usual side chains of connected links and cross chains, and has for its object the provision of improved means for connecting the cross chains of the side chains so that the cross chains may be removed and replaced readily, the connecting means comprising open links.

A further object of the invention is the provision of a connecting link for the side chains and cross chains consisting of an open link having divergent portions that connect with links of the side chains adjacent to the ends thereof to hold the cross chains in fixed position relatively to the side chains and to prevent longitudinal movement of the cross chains relatively to the side chains.

A further object of the invention is the provision of a connecting link adapted for the purpose hereinbefore stated, comprising a base member with divergent sides and having rebent portions, one forming a hook having converging sides that are engaged, and the other rebent portion forming a tongue to engage the hook member to prevent displacement of chain links engaged thereby.

The invention will be described in detail hereinafter and will be found illustrated in the accompanying drawings, in which Figure 1 is a plan view of a fragment of an anti-skid chain showing the improved means for attaching the cross chains to the side chains, Figure 2 is a plan view of the connecting link, Figure 3 is a side view of the connecting link, and Figure 4 is a view showing the application of an anti-skid chain including the improved connecting link to a mired wheel.

In the drawings similar reference characters will be used to designate corresponding parts throughout the several views.

In the anti-skid chain shown in the drawings the side chains are designated A and comprise the connecting links shown, and B indicates the cross chains. The cross chains B are connected to the side chains by means of a connecting link 1 having a base member with divergent sides 2. The converged ends of the divergent side members 2 are extended on substantially parallel lines and engaging one another as shown at 3 and bent as shown at 4 to form a tongue extending inwardly of the base member. The opposite end of the side members 2 are rebent as shown at 5 and have converging side members 6 that are joined at their converged ends 7, said side members 6 and the rebent portions 5 forming a hook that is adapted to engage a link of the side chain A adjacent to its ends to prevent end play of the connecting link, while the tongue 3 and rebent portion 4 engages the end link of the cross chain B, the tongue 3 by engaging the converged portions 7 serves to close the link to prevent displacement of the links engaged thereby. By this structure it will be apparent that the cross chains that are the parts of anti-skid chains that wear out may be readily removed and replaced. It will also be understood that in event of breakage of the side chains that the connecting links may be used as connecting chains to connect the broken portions of the side chains by spreading the two ends of the link 1 forming the tongue 4 and connecting link at one side of the break to one of the rebent portions 5 and the link at the other side of the break to the other rebent portion 5.

It will also be furthermore understood that because of the structure by which the cross chains B may be readily released from the side chains, the anti-skid chain may be utilized for enclosing the exposed portions of a mired wheel in the manner shown in Figure 4 to give the wheel traction to enable releasing the wheel from the mire. The cross chains may be secured to the parts of the side chains A as designated at C where secured across the wheel being temporarily removed from the cross chains to prevent interference in the use of the chains for the purpose stated.

What is claimed is:—

1. An anti-skid chain, comprising links adapted to connect the ends of cross chains to side chains and having spaced members to engage links of the side chains at the ends thereof to prevent longitudinal movement of the cross chains relatively to the side chains.

2. An anti-skid chain, comprising open links adapted to connect the ends of cross chains to side chains and having spaced members to engage links of the side chains at the ends thereof to prevent longitudinal movement of the cross chains relatively to the side chains.

3. A connecting link formed of a length of material bent intermediate of its ends on divergent lines, the material rebent and extended on convergent lines, the extremities of the material extended on substantially parallel lines and engaging each other forming a tongue, and said tongue rebent and engaging under the first mentioned bent portion, said divergent portions adapted to engage the ends of a link of a chain to which the connecting link may be secured to prevent movement thereof relatively to the link.

In testimony whereof I affix my signature.

ROYAL A. SEAGER.